United States Patent Office 3,804,725
Patented Apr. 16, 1974

3,804,725
METHODS AND APPARATUS FOR TREATING AN ARTICLE
Richard Haynes, East Windsor, N.J., assignor to Western Electric Company, Incorporated, New York, N.Y.
Filed Aug. 10, 1972, Ser. No. 279,479
Int. Cl. B01k 3/00; C23b 5/56
U.S. Cl. 204—26
27 Claims

ABSTRACT OF THE DISCLOSURE

An article is treated in the presence of an electrolyte and an electrode, for example, in electroplating the inner wall of a tube. A constant electrical potential difference is applied continuously across the article and the electrode within the electrolyte. A dielectric blocking element engages a portion of the article in such manner as to interrupt the flow of treating current by shielding the portion from substantial exposure to the electrolyte. The blocking element is alternatively disengaged from, and reengaged with, the portion of the article undergoing treatment, providing a pulsed effect in the application of treating current without the utilization of any electrical switching mechanism. An appropriate selection of blocking element shapes, sizes, numbers and spacings permits control of the treating current waveform.

BACKGROUND OF THE INVENTION

This invention relates to methods and apparatus for treating an article and, more particularly, to methods and apparatus for treating an anticle in the presence of an electrolyte and an electrode through the application of electrical current pulses to the article undergoing treatment.

In the art of treating articles, for example, by electroplating techniques, it is known to apply pulses of electrical current between an anode and a cathode within an electrolyte bath. Among the advantages provided by such current pulsing is the counteraction of a tendency for evolved hydrogen gas bubbles to build up along the surface of one or both of the electrodes, the hydrogen tending to interfere with the treating process and thereby to cause irregularities in the treated surface. Greater control of chemical reactions in the vicinity of the electrode surfaces is also provided by current pulsing.

A standard method of applying pulses of electrical current between an anode and a cathode within an electrolyte bath involves the use of an electrical switching mechanism. In a first condition of the switching mechanism, the anode and cathode are coupled across a source of electrical potential. In a second condition of the switching mechanism, the anode and cathode are electrically isolated. The switching mechanism is switched in alternating manner between its first and second conditions in order to effect current pulsing. Such electrical switching, while useful in overcoming hydrogen build-up problems, increases significantly the time required to treat an article and may require costly equipment, for example, where the electroplating of an inner surface of a tube of considerable length, e.g. five to ten meters or longer, is involved.

It is known, also, to electroplate the inner wall of a tube by positioning an anode within the tube, the anode extending axially of the tube and being separated from the inner wall of the tube by a dielectric spacer of circular cross section which is formed into a helical configuration so as to extend axially along the tube about the anode. In such applications, the tube is filled with an electrolyte and may be rotated relative to the anode and to the helical spacer during the application of electroplating current. In order to achieve a smooth, uniform coating, the plating current may be applied in pulses through the use of electrical switching mechanisms in the manner described above, in which case the specified time and cost disadvantages will also be encountered.

SUMMARY OF THE INVENTION

An object of the invention resides in the provision of new and improved methods and apparatus for treating an article, which methods and apparatus may be employed, for example, in electroplating the inner walls of tubes.

The invention contemplates the use of one or more mechanical blocking elements, each composed of a dielectric material, which perform the time-alternating functions, first of shielding one or more portions of an article from substantial exposure to an electrolyte, and then of unshielding and fully exposing to the electrolyte the same portion or portions of the article. A constant electrical potential difference is maintained continuously between the article and an electrode, while the electrode is bathed continuously in the electrolyte. A pulsed current effect is thus achieved at each portion of the article fully exposed intermittently to the electrolyte, even though no electrical switching mechanism is employed. As a result, the overall treatment time may be reduced relative to pulsed treatment techniques employing electrical switching devices.

The technique of the invention is particularly well adapted to electroplating the inner wall of a tube, e.g., plating steel tubes with copper in the manufacture of sections of millimeter waveguide tubing. In a typical embodiment, a steel tube may be rotated relative to a copper anode positioned within the tube with one or more stationary, dielectric spacers separating the anode and the inner wall of the tube, with an electrolyte pumped through the tube, and with a constant electrical potential difference maintained continuously between the anode and the tube. The spacer or spacers have sufficient width, and contact the inner wall of the tube sufficiently tightly, to act as dielectric blocking elements, shielding from substantial contact with the electrolyte successive surface portions of the inner wall of the tube as the tube rotates. A resultant pulsed plating effect occurs at each localized area on the inner periphery of the tube, causing a smooth, relatively fault-free copper coating to form within the tube in a rapid, inexpensive and reliable manner. Variable plating current waveforms and plating times may also be provided through an appropriate selection of the cross-sectional shapes, sizes, numbers and spacings of the dielectric blocking elements, i.e., the spacers.

DETAILED DESCRIPTION

Figure 1:
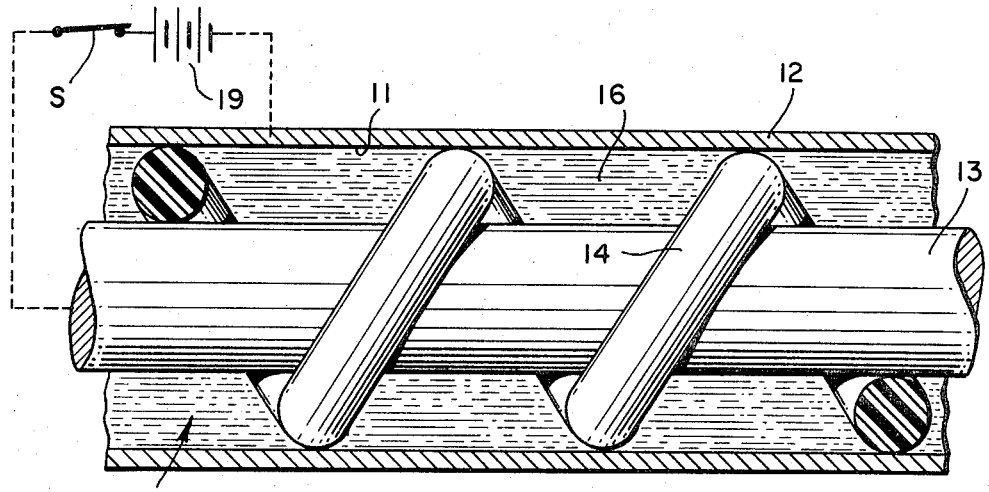
FIG. 1 of the drawing is a side elevational view, partially in section, illustrating a prior art technique for electroplating the inner wall of a tube, the tube containing an electrolyte and an axially extending anode, the anode being kept from contact with the inner wall of the tube by a dielectirc spacer of circular cross section formed into a helical configuration.

Referring to FIG. 1 of the drawing, there is illustrated a prior art technique for electroplating the inner wall 11 of a tube 12. The tube may typically be composed of steel of, for example, an approximately two-inch inner diameter, and the plating may involve the electrodeposition of a copper coating on the inner wall of the tube.

An anode 13, composed of copper if a copper plating is desired for the tube inner wall, is positioned within the tube 12 and extends along the tube axis. The anode may have a typical outer diameter of approximately one inch. A dielectric spacer 14, formed, for example, of a synthetic resin polymer sold under the trademark Teflon, separates the anode 13 from the inner wall of the tube. The spacer 14 is in the shape of a rod of circular cross section formed into a helical configuration so as to extend axially of the tube and thereby keep the anode 13 from contacting the inner wall 11 of the tube. The cross-sectional shape of the spacer helix, taken in a plane perpendicular to the axis of the tube, is, of course, elliptical.

An electrolyte 16, for example, copper cyanide, is pumped generally axially through the interior of the tube 12 while the tube is rotated about the anode 13 and the spacer 14. The electrolyte flows through a generally helical open area 17 defined by the peripheries of the anode 13, the spacer 14 and the inner wall 11 of the tube 12. The helical flow ordinarily takes place at a relatively high velocity, useful in achieving a rapid electroplating operation. A suitable electrical circuit 18 meanwhile couples the anode and the tube across a source 19 of electrical potential such that the tube is rendered cathodic with respect to the anode.

The electrical circuit 18 which couples the anode 13 and the tube 12 across the source 19 may include a conventional electrical switching mechanism S having alternative coupled and decoupled operative conditions. By alternating the switching mechanism S between its coupled condition and its decoupled condition, intermittent pulses of electrical current may be provided for electroplating the inner wall 11 of the tube. As discussed previously, such pulsed electroplating may be useful in assuring the formation of a smooth, uniform coating on the inner wall of the tube.

Figure 2:
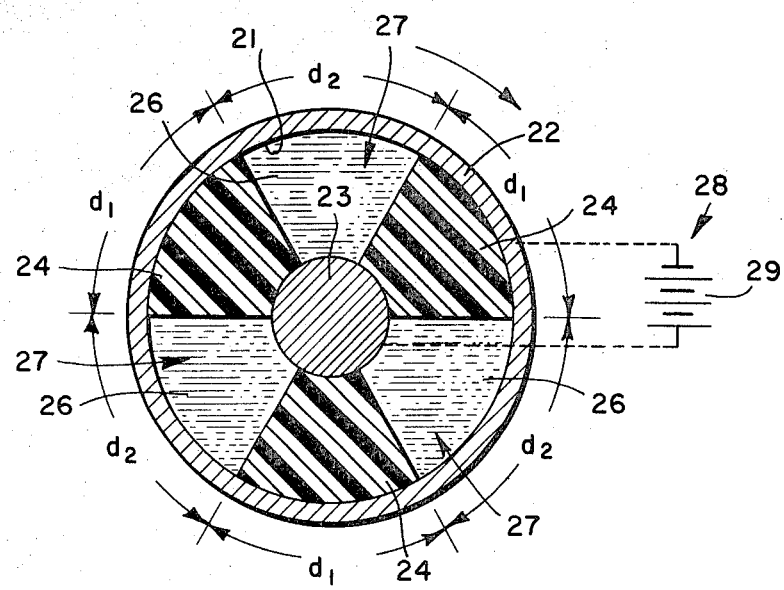
FIG. 2 is a radial cross-sectional view of a tube undergoing a form of pulsed current electroplating in accordance with the principles of the invention, the tube containing an electrolyte, wherein a number of spacer elements which are positioned between the inner wall of the tube and an anode are specifically shaped to produce the desired pulsed current plating effect without the utilization of any external electrical switching mechanism.

Turning next to FIG. 2, there may be seen a radial cross section of apparatus for electroplating the inner wall 21 of a tube 22, similar to the tube 12, in accordance with the principles of the present invention. A central, axially extending anode 23, similar to the anode 13, is separated from the inner wall of the tube by a number of like, dielectric spacers or blocking elements 24, 24, . . . , which may be formed, e.g., of Teflon synthetic resin polymer, of polyethylene or of polypropylene. Each of the blocking elements has an outer surface shaped to conform closely to the inner wall surface 21 of the tube. Each blocking element acts to shield from substantial exposure to an electrolyte 26 that portion of the tube inner wall surface which is engaged by the blocking element. More precisely, although a thin film of electrolyte may be captured between each blocking element and the adjacent inner wall surface, no significant plating effect will be experienced. Substantially all current will flow between the anode and the fully exposed portions of the inner wall surface, and not along any longer, higher resistance path through such captured thin film of electrolyte. It may be observed in FIG. 2 that, in a cross section taken perpendicular to the axis of the tube 22, each blocking element may have the shape of a truncated sector of a circle, the truncation following the outer periphery of the anode 23.

The electrolyte 26 may be composed of copper sulfate at room temperature or of copper cyanide at 160° F. The electrolyte is housed within a number of open areas 27, 27, . . . located between each pair of adjacent blocking elements 24, 24, . . . , and is pumped axially through the tube along the various open areas at a typical flow rate of 25 gallons per minute, although a 0 to 150 gallon per minute range is considered acceptable. The tube 21 is meanwhile continuously maintained cathodic with respect to the anode 23 by an electrical circuit 28 which couples both the tube and the anode continuously across a source of constant electrical potential 29. The tube 21 is also rotated relative to the anode 23 and to the blocking elements 24, 24, . . . such that the portions of the tube inner wall surface 11 which are shielded from substantial exposure to the electrolyte 26 by the blocking elements continually change with time.

Figure 3:
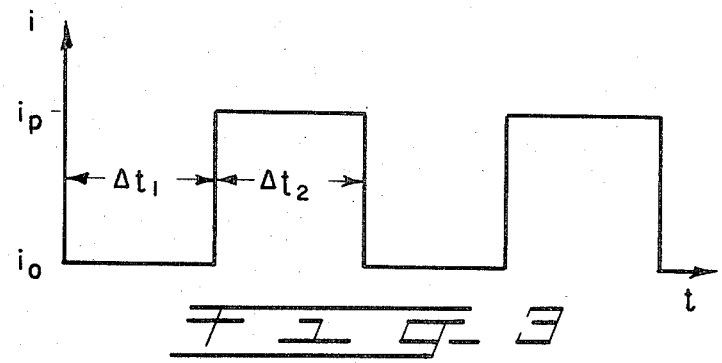
FIG. 3 is a schematic plot of current versus time depicting the time variation in current density at any given point on the inner wall of a tube undergoing electroplating in accordance with the plating method illustrated in FIG. 2.

Referring now to FIG. 3 of the drawing, a schematic pattern of current versus time is depicted for any point of interest on the inner wall 21 of the tube 22. Continuous rotation of the tube relative to the blocking elements 24, 24, . . . at a constant angular velocity is assumed.

During a first time period $\Delta t_1$, no plating current is applied to the point of interest, while one of the blocking elements shields the point from substantial exposure to the electrolyte 26. The length of the time period $\Delta t_1$ is, of course, a function of the arcuate span $d_1$ of the outer periphery of the blocking element shielding the point of interest and of the angular velocity of the tube rotation relative to the blocking elements. The current during the time period $\Delta t_1$ is represented in FIG. 3 as $i_o$, which may correspond to an insignificant corrosion current which flows as a result of electrochemical dissolution without voltage application. In time, unless the blocking elements 24, 24 . . . are periodically replaced, wear effects may cause an observable increase in the value of $i_0$.

During a second time period $\Delta t_2$, a plating current $i_p$ is applied to the point of interest, no blocking element shielding the point from substantial exposure to the electrolyte 26. The length of the time period $\Delta t_2$ is a function of the arcuate span $d_2$ of the open space 27 relatively traversing the point of interest and, once again, of the relative angular velocity of the tube rotation.

If the arcuate span of the outer periphery of each blocking element is equal to that of the each other blocking element and the arcuate span of each open space is also equal to that of each other open space, a single, periodically repeated pattern of applied current versus time is observable at the point under investigation. If the arcuate span $d_1$ of the outer periphery of each blocking element and the arcuate span $d_2$ of each open space are taken to be identical, $\Delta t_1$ and $\Delta t_2$ will be equal and a substantially square wave pattern of current versus time will be provided. If, on the other hand, the arcuate span $d_1$ of the outer periphery of each blocking element is not identical to the arcuate span $d_2$ of each open space, $\Delta t_1$ will differ from $\Delta t_2$ and the pattern of current versus time will be that of a substantially rectangular wave other than a square wave. Thus, it should be clear that the respective arcuate spans may be selected for the specific purpose of providing a particular, regularly repeating pattern of current versus time.

Figure 4:
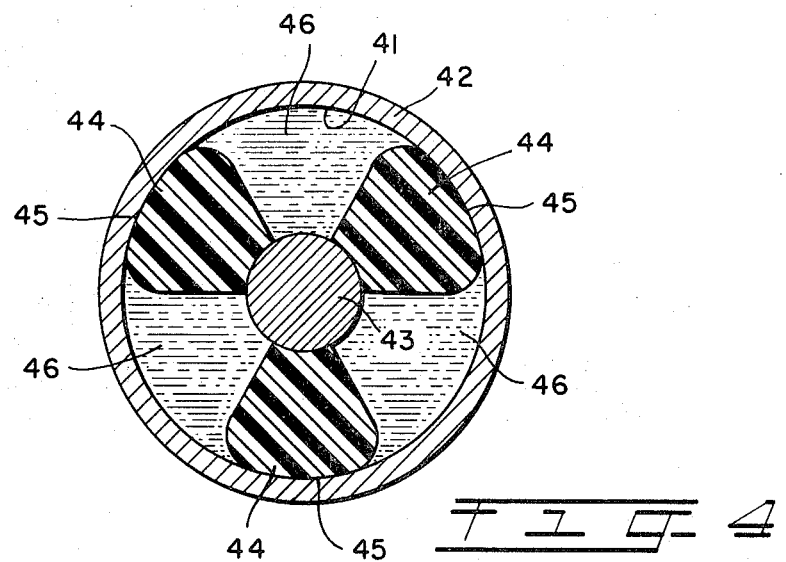
FIG. 4 is a radial cross-sectional view of a tube undergoing an alternative form of pulsed current electroplating in accordance with the principles of the invention, the tube containing an electrolyte, wherein a number of alternative spacer elements which are positioned between the inner wall of the tube and an anode are specifically shaped to produce the desired pulsed current plating effect without the utilization of any external electrical switching mechanism.

Turning now to FIG. 4 of the drawing, there is illustrated an alternative scheme for electroplating the inner wall 41 of a tube 42 in accordance with the principles of the invention. An electrical circuit (not shown) maintains continuously a constant electrical potential difference between an anode 43 and the tube. The anode extends longitudinally of the tube along the tube axis and is separated from the inner wall of the tube by a number of like dielectric spacers or blocking elements 44,44, . . . .

Each blocking element 44 has a cross section, in a plane perpendicular to the axis of the tube 42, of a shape generally similar to that of each blocking element 24 of the embodiment of FIG. 2. The blocking elements, 44,44, . . . differ from the blocking elements 24,24 . . . , however, in that each blocking element 44 has a radially outermost surface 45 with both edges rounded off at a much smaller radius of curvature than that of the tube inner wall 41. Thus, while each blocking element 44 contacts the inner wall of the tube along a central portion of the radially outermost surface 45 of the blocking element, other locations on the blocking element surface 45 are spaced from the inner wall, the spacing increasing with the distance from the central portion of the surface 45.

The blocking elements 44,44 . . . serve to shield from substantial exposure to an electrolyte 46 those inner wall surface areas which are closely engaged by the blocking elements along the central portions of the blocking element surfaces 45,46, . . . . As may be seen from FIG. 5, due to their rounded edges the blocking elements 44,44 . . . tend also to shield and expose in a progressive manner, rather than in the abrupt manner provided by the square or rectangular wave pattern of FIG. 3, those inner wall surface areas respectively immediately ahead of and immediately rearward of the portion of the tube inner wall closely engaged by the central portions of the blocking elements as the tube 42 is rotated relative to the blocking elements.

Figure 5:
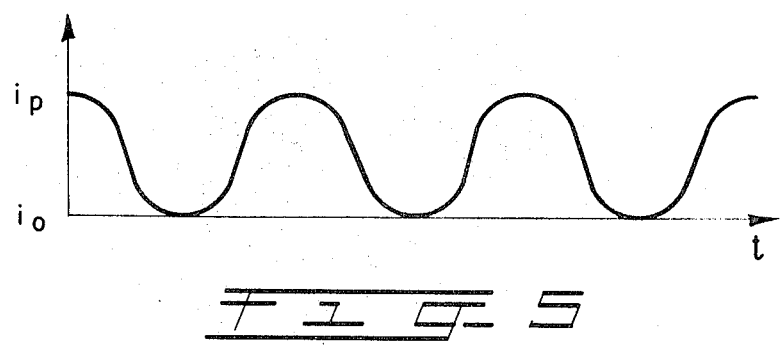
FIG. 5 is a schematic plot of current versus time depicting the time variation in current density at any given point on the inner wall of a tube undergoing electroplating in accordance with the plating method illustrated in FIG. 4.

The current versus time pattern exhibited by the electroplating technique of FIG. 4 is illustrated schematically in the curve of FIG. 5. The current applied to any point of interest on the inner wall 41 of the tube 42 varies with time between a maximum plating current $i_p$ and an insignificant corrosion current $i_0$. With a suitably selected spacing between adjacent blocking element 44,44 . . . , a sufficient angular velocity of relative rotation of the tube with respect to the blacking elements and an appropriate configuration of each radially outermost surface 45, the variation with time in the current applied to the point of interest may tend to approach a sine wave, in the manner depicted.

A slight modification of the embodiment of FIG. 4 might involve the use of blocking elements with radially outermost surfaces similar to the surfaces 45,45, . . . , but shaped remote from the radially outermost surfaces other than as a truncated sector of a circle. For example, each blocking element might take the shape, in cross section, of a modified ellipse. The blocking element would contact the inner wall 41 of the tube 42 along a surface substantially parallel to the major axis of the ellipse, the wall-contacting surface of the blocking element having a configuration generally corresponding to that of the surface 45. It should be noted that, in order to provide a significant pulsed current plating effect along the inner wall of the tube, such as that illustrated in FIG. 5, in any embodiment of the invention the blocking element cross section must shield from substantial exposure to the electrolyte a zone of appreciable width along the inner wall of the tube, in contradistinction to the essentially point contact between the unmodified elliptical section of the prior art helical spacer 14 (FIG. 1) and the inner wall 11 of the tube 12.

Other current versus time patterns may, of course, be provided by an appropriate selection of blocking element shapes, sizes, numbers and spacings. It should be clear that blocking elements in a variety of shapes are contemplated for purposes of achieving plating with various patterns of pulsations in current application. It should be pointed out, also, that the various blocking elements may be formed into generally helical shapes in instances where a helical electrolyte flow path might be considered advantageous for high speed plating, as in the case of the prior art system shown in FIG. 1 of the drawing.

It is to be understood that the described methods and apparatus are simply illustrative of certain embodiments of the invention. The invention also contemplates, for example, treatment of articles by anodization rather than by electroplating, the disclosed techniques being equally well suited to either type of treatment. Moreover, the treatment of articles other than tubes and the treatment of external, rather than internal, surfaces of articles are also envisioned. Many additional modifications may be made without departing from the invention.

What is claimed is:

1. Apparatus for treating an article in the presence of a fluid electrolyte and an electrode to produce the effect of a continuously pulsing, constant-amplitude, plating current, which apparatus comprises:
    means for coupling the article and the electrode continuously across a source of electrical potential;
    means for maintaining the electrode continuously immersed in the electrolyte;
    an electrically insulating fluid blocking means rendered effective in a shielding position in engagement with an at least one portion of the perimeter of the article for shielding from exposure to the electrolyte said at least one portion of the perimeter of the article, said portion having a finite area; and
    means for moving the blocking means relative to the article alternatingly into said shielding position and out of said shielding position so as to intermittently expose said at least one portion of the perimeter of the article to the electrolyte during the treating period whereby a continuously pulsing, constant-amplitude, plating current is effected.

2. Apparatus for treating an article in the presence of a fluid electrolyte and at least one electrode to produce the effect of a continuously pulsing, constant-amplitude, plating current, which apparatus comprises:
    means for coupling the article and the at least one electrode continuously across a source of electrical potential;
    means for maintaining the at least one electrode continuously immersed in the electrolyte;
    an electrically insulating fluid blocking means which during the treating period is rendered effective in a first operating condition for engaging an at least one portion of the perimeter of the article so as to shield from exposure to the electrolyte said at least one portion of the perimeter of the article, said portion having a finite area, and rendered effective in a second operating condition for fully exposing to the electrolyte at least part of that at least one portion of the perimeter of the article shielded from exposure to the electrolyte when said blocking means is in the first position; and
    means for shifting cyclically between said first and second operating conditions of the blocking means to produce the effect of a continuously pulsing, constant-amplitude, plating current.

3. In the apparatus of claim 2, said shifting means comprising:
    means for imparting relative rotary movement between the blocking means and the article.

4. In the apparatus of claim 2, said blocking means is rendered effective in said second operating condition for engaging and shielding from exposure to the electrolyte a second, and at least partially different part of said at least one, portion of the perimeter of the article of finite area.

5. In the apparatus of claim 4, said shifting means comprising:
    means for imparting relative rotary movement between the blocking means and the article.

6. In the apparatus of claim 2, the article being a tube and the treatment involving treating an inner wall of the tube:
   said blocking means being positioned within the tube, the blocking means including at least one elongated blocking element extending generally axially of the tube in contact with the inner wall of the tube with an open area disposed at each side of the blocking element, each open area housing at least a portion of the electrolyte and the at least one electrode; and
   said shifting means comprising means for imparting relative rotation between each blocking element and the tube about the axis of the tube so as to cyclically shield and unshield the inner wall of the tube from the electrolyte as each blocking element is moved relative to the inner wall.

7. In the apparatus of claim 6:
   means for forcing the electrolyte to flow generally axially through the tube along each open area adjacent to each blocking element.

8. In the apparatus of claim 6:
   a cross section taken in a plane radial to the tube including a number of blocking elements and open areas in alternating array, the blocking elements being alike in cross-sectional size and shape and the open areas also being alike in cross-sectional size and shape.

9. In the apparatus of claim 8:
   each blocking element and each open area each having the cross-sectional shape, adjacent to the inner wall of the tube, of a sector of a circle.

10. In the apparatus of claim 9:
    said blocking element sectors each having an arcuate span equal to the arcuate span of each open area so that the shielding cycle time is identical to the unshielding cycle time for every location along the inner wall of the tube with constant angular velocity rotation of the tube relative to blocking elements.

11. In the apparatus of claim 9:
    said blocking element sectors each having an arcuate span differing from the arcuate span of each open area so that the shielding cycle time differs from the unshielding cycle time for every location along the inner wall of the tube with constant angular velocity rotation of the tube relative to the blocking elements.

12. In the apparatus of claim 8:
    each blocking element having the cross-sectional shape, adjacent to the inner wall of the tube, of a sector of a circle with edges rounded off at a smaller radius of curvature than the radius of the circle.

13. In the apparatus of claim 8:
    said at least one electrode extending generally axially of the tube radially inwardly of each blocking element and each open area, and
    each blocking element being generally truncated radially inwardly of the inner wall of the tube adjacent to the at least one electrode.

14. Apparatus for electroplating the inner wall of a tube said apparatus effecting a continuously pulsing, constant-amplitude, plating current, which apparatus comprises:
    means for supporting the tube;
    an elongated electrode;
    means for mounting the electrode within the tube so as to extend along the axis of the tube;
    an electrically insulating fluid blocking element extending generally axially of the tube between the electrode and the tube, the blocking element having a cross-sectional configuration in a plane radial to the tube which includes a blocking surface engaging the inner wall of the tube along an extended arcuate portion of the surface of the inner wall;
    an electrolyte located within the tube and surrounding the electrode, the electrolyte engaging the inner wall of the tube only along an extended arcuate portion of the surface of the inner wall not engaged by the blocking surface of the blocking element;
    means for coupling the tube and the electrode continuously across a source of electrical potential in such manner as to render the tube cathodic with respect to the electrode; and
    means for rotating the tube relative to the blocking element about the axis of the tube at constant angular velocity so as to cyclically shield and unshield every location along the inner wall of the tube from exposure to said electrolyte during the electroplating period.

15. In the apparatus of claim 14:
    a cross section taken in a plane radial to the tube including a like number of similar blocking elements spaced equiangularly about the axis of the tube and each including a blocking surface engaging the inner wall of the tube along an arcuate portion of the surface of the inner wall during the electroplating period.

16. In the apparatus of claim 15:
    each blocking element having the configuration, along a portion of the cross section adjacent to the inner wall of the tube, of a sector of a circle.

17. In the apparatus of claim 16:
    the arcuate extent of the blocking surface of each blocking element and each space between the blocking surfaces of each pair of adjacent blocking elements being identical so that the shielding cycle time is identical to the unshielding cycle time for every location along the inner wall of the tube with constant angular velocity rotation of the tube relative to the blocking elements.

18. In the apparatus of claim 16:
    the arcuate extent of each blocking surface of the blocking elements differing from that of the spaces between the blocking surfaces of each pair of adjacent blocking elements so that the shielding cycle time differs from the unshielding cycle time for every location along the inner wall of the tube with constant angular velocity rotation of the tube relative to the blocking elements.

19. In the apparatus of claim 15:
    each blocking element having the configuration, along a portion of the cross section adjacent to the inner wall of the tube, of a sector of a circle with edges rounded off at a smaller radius of curvature than the radius of the circle.

20. A method of treating an article in the presence of a fluid electrolyte and an electrode to produce the effect of a continuously pulsing, constant-amplitude, plating current, said method comprising the steps of:
    immersing the electrode in the electrolyte;
    placing the article in contact with the electrolyte;
    continuously maintaining a voltage difference cross said electrolyte between said article and said electrolyte; while
    repetitively and sequentially engaging and disengaging an electrically insulating fluid blocking element with an at least one portion of the perimeter of the article during the treating process thereby to sequentially interpose between said electrolyte and said at least one portion of the perimeter of the article said blocking element whereby said at least one portion of the article is cyclically shielded and unshielded from exposure to said electrolyte to produce the effect of a continuously pulsing, constant-amplitude, plating current, said at least one portion of the perimeter of the article having a finite area.

21. A method of treating an article in the presence of a fluid electrolyte and an electrode to produce the effect of a continuously pulsing, constant-amplitude, plating current, said method comprising the steps of:
    immersing the electrode in the electrolyte;

placing the article in contact with the electrolyte;

continuously maintaining an electrical potential difference across said electrolyte between the article and the electrode; while repetitively engaging with a portion of the perimeter of the article an electrically insulating fluid blocking element to shield said portion of the perimeter of the article from exposure to said electrolyte when said blocking element is in its shielding position, said portion of the perimeter of the article having a finite area; and cyclically interrupting the shielding of said portion of the perimeter of the article during the treating process by intermittently removing the blocking element from said shielding position relative to the article so as to expose said at least one portion of the perimeter of the article to exposure to the electrolyte and then reengaging the blocking element into said shielding position relative to the article thereby to produce the effect of a continuously pulsing, constant-amplitude, plating current.

22. A method of treating an article in the presence of a fluid electrolyte and an electrode to produce the effect of a continuously pulsing, constant-amplitude, plating current, said method comprising the steps of:

immersing the electrode in the electrolyte;

placing the article in contact with the electrolyte;

continuously maintaining an electrical potential difference across said electrolyte between the article and the electrode; while repetitively engaging an electrically insulating fluid blocking element with an at least one portion of the perimeter of the article to shield said at least one portion of the perimeter of the article from exposure to said electrolyte when said blocking element is in a first position relative to said article, the at least one portion of the perimeter of the article having a finite area; and imparting relative movement between the blocking element and the article in such manner as to alternate cyclically between said first position of the blocking element relative to the article and a second position of the blocking element relative to the article, in which second position there is fully exposed to the electrolyte at least part of that at least one portion of the perimeter of the article previously shielded from exposure to the electrolyte when said blocking element was in the first position.

23. In the method of claim 22, said cyclical movement imparting step comprising:

cyclically imparting relative rotary movement between the blocking element and the article in such manner as to alternate cyclically between said first and second positions of the blocking element.

24. In the method of claim 22, said cyclical movement imparting step comprising:

imparting relative movement between the blocking element and the article in such manner as to alternate cyclically between said first position of the blocking element relative to the article and a second position of the blocking element relative to the article, in which second position the blocking element engages a second, and at least partially different, portion of the perimeter of the article having a finite area so as to shield said second portion of the perimeter of the article from exposure to the electrolyte.

25. In the method of claim 22, the article being a tube and the treatment involving treating the inner wall of the tube with at least one blocking element positioned within the tube, said at least one blocking element extending generally axially of the tube and continuously in contact with the inner wall of the tube with an open area disposed at each side of said at least one blocking element, each open area housing at least a portion of the electrolyte, said cyclical movement imparting step comprising:

imparting relative rotation between said at least one blocking element and the tube about the axis of the tube so as to cyclically shield and unshield the inner wall of the tube as said at least one blocking element is moved relative to the inner wall.

26. In the method of claim 25, the further step of:

forcing the electrolyte to flow generally axially through the tube along said at least one open area adjacent to each blocking element.

27. In the method of claim 25, a cross section taken in a plane radial to the tube including a number of blocking elements and open areas in alternating array, the blocking elements being alike in cross-sectional size and shape and the open areas also being alike in cross-sectional size and shape, said rotation imparting step comprising:

imparting relative rotation between the blocking elements and the tube continuously at a constant angular velocity so as to generate, at any given position on the inner wall of the tube, a constant, continuous, cyclical pattern in the variation with time of plating current application through the electrolyte between the electrode and the given position on the inner wall of the tube.

References Cited
UNITED STATES PATENTS

| | | | |
|---|---|---|---|
| 3,022,232 | 2/1962 | Bailey | 204—26 |
| 1,927,162 | 9/1933 | Fiedler et al. | 204—5 |
| 2,503,863 | 4/1950 | Bart | 204—224 |
| 2,689,215 | 9/1954 | Bart | 204—26 |
| 2,859,157 | 11/1958 | Curtiss, Jr. | 204—26 |

FOREIGN PATENTS

| | | |
|---|---|---|
| 1,198,165 | 8/1965 | Germany ____ 204—DIG.—007 |
| 18,391 | 2/1929 | Australia. |

THOMAS M. TUFARIELLO, Primary Examiner

U.S. Cl. X.R.

204—228, DIG. 9

L-566-PT
(6-69)

UNITED STATES PATENT OFFICE
CERTIFICATE OF CORRECTION

Patent No. 3,804,725  Dated April 16, 1974

Inventor(s) R. Haynes

It is certified that error appears in the above-identified patent and that said Letters Patent are hereby corrected as shown below:

In the specification, Column 1, line 33, "anticle" should read --article--. Column 2, line 60, "dielectirc" should read --dielectric--. Column 4, line 54, "of the each" should read --of each--. Column 5, line 25, "45,46" should read --45,45--; line 43, "blacking" should read --blocking--.

In the claims, Column 7, line 11, "said" should begin a new paragraph; line 29, delete "each" (third occurrence); line 31, "of a sector" should read --comprising a different sector--; line 38, "to blocking" should read --to the blocking--. Column 8, line 1, "if the" should read --of the--; line 56, "cross" should read --across--.

Signed and sealed this 17th day of September 1974.

(SEAL)
Attest:

McCOY M. GIBSON JR.
Attesting Officer

C. MARSHALL DANN
Commissioner of Patents